Nov. 18, 1924.  
C. AMEDEE-MANNHEIM  
1,516,070  
PROGRESSIVE CHANGE SPEED GEAR  
Filed Dec. 4, 1922  2 Sheets-Sheet 1

Inventor  
C. Amedee-Mannheim  
By Marks & Clerk  
attys.

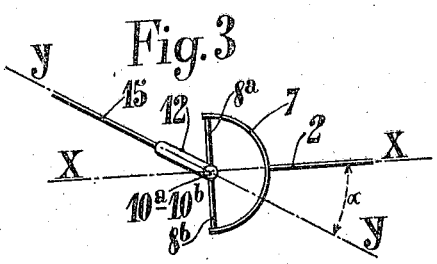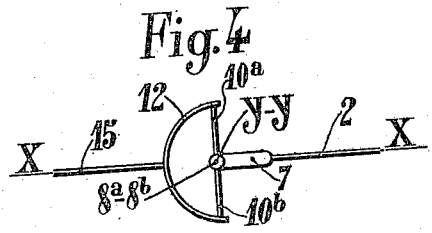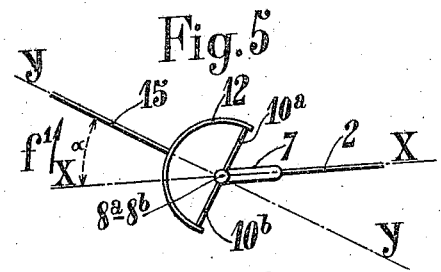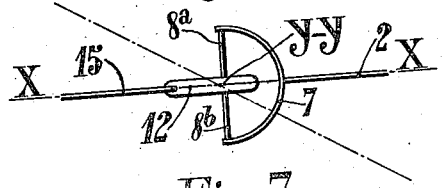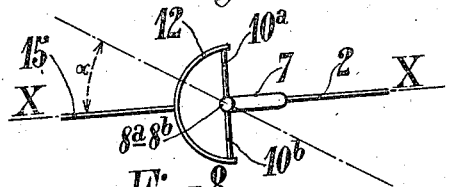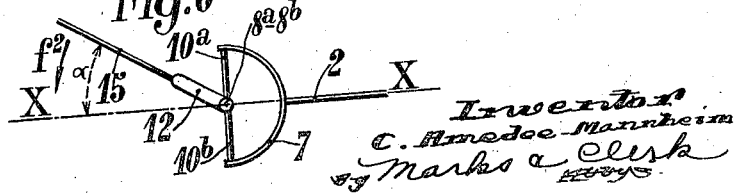

Patented Nov. 18, 1924.

1,516,070

UNITED STATES PATENT OFFICE.

CHARLES AMEDEE-MANNHEIM, OF PARIS, FRANCE.

PROGRESSIVE CHANGE-SPEED GEAR.

Application filed December 4, 1922. Serial No. 604,867.

*To all whom it may concern:*

Be it known that I, CHARLES AMEDEE-MANNHEIM, a citizen of the French Republic, residing at 21 Boulevard Beausèjour, Paris, France, have invented new and useful Improvements in a Progressive Change-Speed Gear, of which the following is the specification.

A Cardan joint comprises a spider having two branches at right angles; at the ends of each of the branches are pivoted forks keyed on shafts the axes of which intersect each other at the center of the spider. A joint thus devised allows the rotation from one of the shafts to be transmitted to the other, when the axes of these two shafts are relatively inclined. In this transmission of movement, owing to the fact that the axes of the shafts are fixed in space, the two branches of the spider each rotate in a different plane; these two planes are at right angles to the axes of the two shafts. Consequently, each branch of the spider receives, relatively to the plane of rotation of the other, a certain movement. It is known that this movement is an alternating rotation, in other words an oscillation, the amplitude of which is double the angle formed by the axes of the shafts.

A Cardan joint allows therefore, outside its known application of transmission of a movement of rotation between two inclined shafts, to decompose a continuous rotary movement in two oscillations, which take place in two planes at right angles, and the amplitudes of which are equal to double the angle which form together the shafts of the joint.

By causing this angle to vary, the amplitudes of the oscillations are therefore caused to vary.

The preceding remarks do not obviously form the subject-matter of the invention; but the mechanism described hereafter rests on these remarks.

The invention consists in selecting the oscillations obtained, as just described, by means for instance of free wheels, so as to obtain intermittent rotations of constant direction; then in composing these rotations, which take place in planes at right angles, into a single resulting rotation, the speed of which depends on the amplitude of the primitive oscillations, and consequently, of the angle formed by the two shafts of the Cardan joint; the speed of the resulting rotation can therefore be caused to vary progressively.

It is to be noted that the driving shaft is constituted by one of the shafts of the Cardan joint, but that the driven shaft which receives the resulting rotation, is not one of the shafts of the Cardan joint.

The accompanying drawing illustrates by way of example a form of carrying out the invention.

Figs. 3 to 8 are explanatory diagrams.

Figure 1:
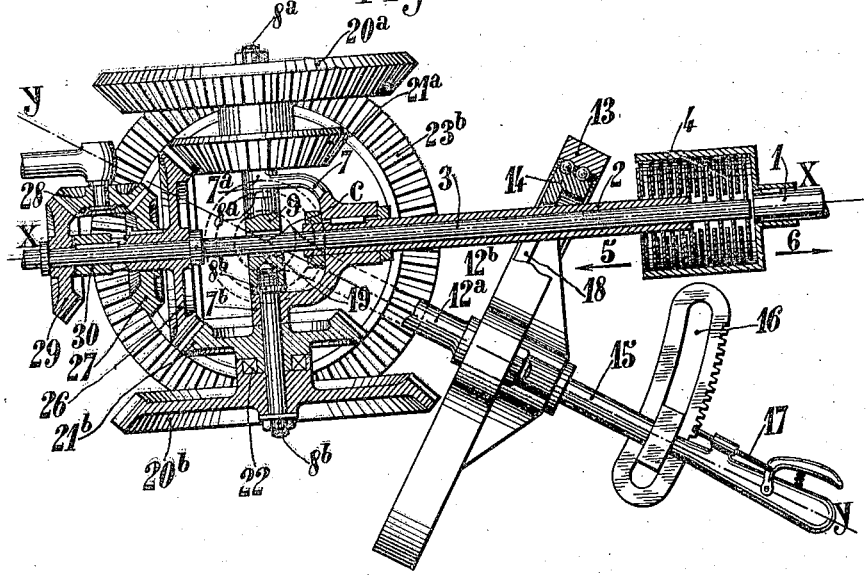
Fig. 1 is a sectional elevation of the mechanism as a whole.
Figure 2:
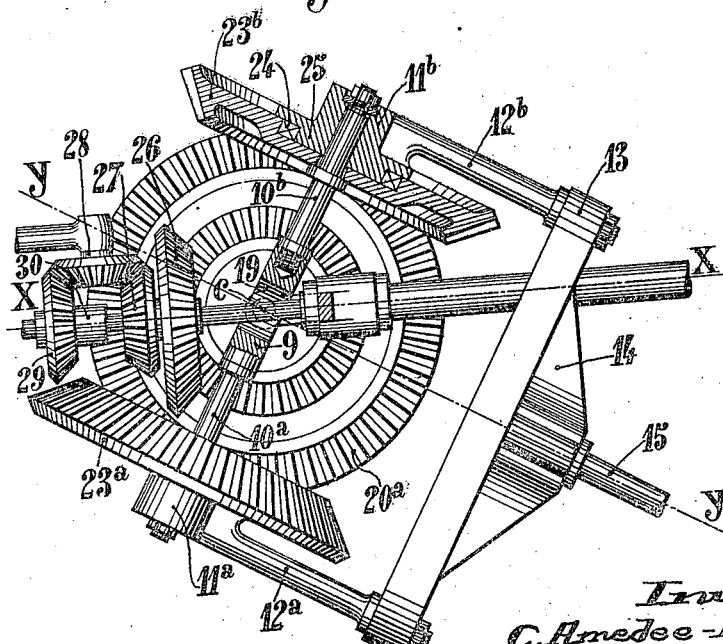
Fig. 2 is a view similar to Fig. 1, the driving shaft having turned to the extent of a quarter of a revolution.

The form of construction illustrated in Figs. 1 and 2 is constituted as follows:

The driving shaft 1 can be rendered rigid with the secondary driving shaft 2 or the driven shaft 3, according as the plate clutch 4 is pushed in the direction of the arrow 5 or in the direction of the arrow 6.

It will be supposed that the driving shaft 1 is rendered rigid with the secondary driving shaft 2. On the end of this shaft is keyed a fork 7 the branches $7^a$ and $7^b$ of which form bearings in which are journalled the axes $8^a$ and $8^b$, secured in alignment with each other on the sleeve 9. This sleeve receives two other axes $10^a$ and $10^b$, also secured in alignment with each other and at right angles to the axes $8^a$ and $8^b$, and the ends of which are journalled in the bearings $11^a$ and $11^b$ connected by columns $12^a$ and $12^b$ to the crown 13; this crown can freely rotate about the stationary plate 14. The plate 14 carries a lever 15, guided in a quadrant slot 16, having for center the geometrical point $c$ of intersection of the axes 8 and 10. The lever 15 can be immobilized in position of any suitable device and in particular by means of a locking device similar to those used for the control levers of motor cars.

The plate 14 is formed with a slot 18, through which passes the secondary driving shaft 2 and the driven shaft 3 which passes through the preceding one through an axial hole in the shaft 2. By this arrangement, the plate 14 can be caused to rotate about the point c, for the purpose explained hereafter. The sleeve 9 is also provided with an elongated opening 19 permitting the passage of the driven shaft 3.

It will be seen that a Cardan joint has been obtained, the axes of the forks of which are X—X and Y—Y.

On each of the axes $8^a$ and $8^b$ are journalled two pinions: $20^a$—$20^b$ and $21^a$—$21^b$.

The pinions 20—21 are connected by a free wheel selecting system 22. On the other hand, on each of the axes $10^a$ and $10^b$ are journalled pinions $23^a$ and $23^b$ gearing with the pinions 20 and which are connected by free wheel selecting systems 24 to the bearing parts 25 of the bearings $11^a$ and $11^b$. The selectors 22 and 24 are so arranged that an observer, placed at the center c of the Cardan joint, looking successively at each of these selectors, sees that they all have the same direction of action: this direction will be defined hereafter.

The pinions $21^a$—$21^b$ gear with a pinion 26, loose on the driven shaft 3; a pinion 27 is rigid with the pinion 26 and gears with the pinion 28 loosely rotating on a fixed axis; this pinion 28 gears in its turn with the pinion 29 loose on the driven shaft 3. A coupling 30 keyed on the driven shaft 3 but capable of sliding on the same, allows the driven shaft 3 to be rendered rigid with either the pinion 27 or the pinion 29.

The operation is described hereafter, by supposing that the whole is initially in the position of Fig. 1 and I shall examine what happens during a quarter of a revolution of the driving shaft 1, for arriving consequently to the position of Fig. 2.

Figs. 3 to 8 allow a clear understanding of the operation. Fig. 3 is a diagram of a Cardan joint, in elevation similar to Fig. 1; Fig. 4 is a corresponding plan view. Figs. 5 and 6 are respectively an elevation and a plan view of this joint after a quarter of a revolution. Figs. 7 and 8 illustrate in elevation and plan view the joint after a quarter of a revolution, supposing the lever 15 is free, and the joints locked, that is to say rigid joints.

It will be seen, by comparing Figs. 5 and 7, that everything has taken place as if the lever 15 had come in the position of Fig. 7, then had turned in the direction of the arrow $f^1$ according to an angle α for coming in the position of Fig. 5.

Moreover, it will be seen by comparing Figs. 6 and 8 that this lever has also received a rotary movement according to an angle α, in a plane at right angles to that of the preceding rotation and in the direction of the arrow $f^1$.

Referring again to Figs. 1 and 2, it will therefore be seen that one of the wheels 23 has turned owing to the rotation $f^2$ according to an angle α equal to the angle formed by the axes X X and Y Y about the axis 10 which corresponds thereto; the other wheel 23 is not obviously driven by the selecting device relating thereto as will be understood from what has been said above concerning the arrangement of these selectors. On the other hand, it will be seen that the axes $10^a$ and $10^b$, owing to the rotation $f^1$ have turned according to an angle α about the axes $8^a$ $8^b$. Therefore, the wheels 23 are subjected to a gyration in the direction $f^1$ and according to an angle α and constitute consequently the star pinions of an epicyclic gear the wheels 20 of which are the planet wheels; on the other hand, one of the wheels 23 receives, as previously indicated, a rotation in the direction $f^2$ and according to an angle α.

Owing to the properties of epicyclic gears, the movement transmitted to the planet wheels 20 is therefore the resultant of the composition of this rotation and of this gyration.

It will be understood that for one of the wheels 20, this resultant is the sum of the rotation and of the gyration, whilst for the other wheel 20 the resultant is the difference thereof. The free wheel selectors 22 are so arranged that, outside the consideration previously indicated, their direction of action permits the wheels 20 which receive the sum of the gyration and of the rotation of transmitting movement to the pinion 21 corresponding thereto. It will be seen that, for a quarter of a revolution of the driving shaft, one of the pinions 21 ($21^a$ for instance) receives a rotation equal to 2α, it would; then easily be seen that, per half-revolution of the driving shaft, this pinion $21^a$ receives a rotation of 4α. For the following half-revolution, the pinion $21^b$ receives in its turn a rotation of 4α, but in reverse direction to the preceding one; now the two pinions 21 gear with the pinion 27; the latter, per revolution of the driving shaft, will therefore receive a rotation of constant direction equal to $8α \frac{m}{m}$, if I designate by $\frac{n}{m}$ the ratio of the number of teeth of the pinions 21 and 26.

The selecting systems 22 and 24 are arranged (this constituting the third condition of construction of these selectors) in such a manner that the transmission $8α \frac{m}{m}$ transmitted to the pinion 26 is of reverse direction to the rotation of the driving shaft. In these conditions, it will be seen that the gyration of the pinions 21 about the axis X—X is not transmitted to the pinion 26, but that alone their own rotation $4α \frac{n}{m}$ is transmitted to this pinion. Therefore, as long as the resultant rotation $8α \frac{n}{m}$ which takes place for a revolution of the driving shaft, is inferior to 360°, the pinion 26 is not actuated. This pinion is actuated as soon as $8\alpha \frac{n}{m}$ greater than 360°, that is to say as soon as $\alpha$ greater than $45° \frac{m}{n}$, at a speed increasing progressively with $\alpha$.

It will be therefore noted that the speed of the driven shaft 3, even when it is very small, is the difference of two rapid rotations, that is to say it will be possible to transmit great stresses with small intermediate sets of teeth. Besides, it will be seen that the gyration of the wheels 23 relatively to the wheels 20 is purely relative, but that the absolute movement of these wheels is a continuous rotation about the axis Y—Y, this obviously excluding any effect of inertia.

For permitting the putting out of circuit, of the system described and the throwing into gear in direct drive of the driven shaft 3 on the driving shaft 1, it is necessary for the shaft 3 to rotate in the same direction as the shaft 1, in normal running. The train of gears 27, 28, 29 permits this result being obtained. When the coupling 30 is in gear with the pinion 29, the forward running is thus obtained; by throwing this coupling in gear with the pinion 27, the backward running is obtained. In the position for forward running, if the shafts 3 and 1 are directly thrown in gear, by means of the clutch 4, and the coupling 30 is placed in such a manner that it is no longer in gear with any pinion, the direct drive is obtained, the mechanism described being put completely out of action.

What I claim as my invention and desire to secure by Letters Patent is:—

1. In a progressive change speed gear, a Cardan joint comprising a spider having four arms at right angles and two supports each pivoted on two arms forming an extension of the spider, four toothed bevel wheels gearing together and each loosely mounted on each arm of the spider, selectors connecting two opposed wheels of these four wheels to the corresponding support, two bevel pinions loosely mounted on the arms of the spider carrying the two other wheels, selectors connecting the latter pinions to the latter wheels, a driven pinion gearing with the latter pinion, a driven shaft on which is secured this driven pinion.

2. In a progressive change speed gear, a Cardan joint comprising a spider having four arms at right angles and two supports each pivoted on two arms forming an extension of the spider, a driving shaft having a fixed geometrical axis on which is secured one of the supports, a bearing guiding the rotation of the second support, means for moving the said bearing and immobilizing it in position, four toothed bevel wheels gearing together and each loosely mounted on each arm of the spider, selectors connecting two opposed wheels of these four wheels to the corresponding support, two bevel pinions loosely mounted on the arms of the spider carrying the two other wheels, selectors connecting the latter pinions with the latter wheels, a driven pinion gearing with the said latter pinions, a driven shaft on which this driven pinion is secured.

3. In a progressive change speed gear, a Cardan joint comprising a spider having four arms at right angles and two supports each pivoted on two arms forming an extension of the spider, a driving shaft having a fixed geometrical axis on which is secured one of the supports, a circular frame on which can rotate the second support, a lever secured on the frame for permitting to move the latter, four toothed bevel wheels gearing together and each loosely mounted on each arm of the spider, selectors connecting two opposed wheels of these four wheels to the corresponding support, two bevel pinions loosely mounted on the arms of the spider carrying the two other wheels, selectors connecting the latter pinions with the latter wheels, a driven pinion gearing with the latter pinions, a driven shaft on which the driven pinion is secured.

4. In a progressive change speed gear as claimed in claim 3, an axial perforation of the driving shaft, through which passes the driven shaft which extends beyond the driving shaft, driving plates integral with the driven shaft, means for causing either the plates secured on the driving shaft, or the plates secured on the driven shaft, to become rigid with a primary driving shaft, the arrangement of the selectors so that the rotation of the driven pinion may be of reverse direction to the driving rotation, a pinion rigid with the driven pinion, a fixed axis, a pinion loosely rotating with this axis and gearing with the pinion rigid with the driven pinion, a pinion gearing with this pinion having a fixed axis and loose on the driven shaft, means for transmitting to the driven shaft either the rotation of the latter pinion, or that of the driven pinion.

In testimony whereof I have signed my name to this specification.

CHARLES AMEDEE-MANNHEIM.